Feb. 16, 1937.  S. S. McDONALD  2,070,993
VEHICLE WHEEL
Filed July 23, 1935  2 Sheets-Sheet 1

INVENTOR:
Stephen S. McDonald,
BY O. Martin
his ATTORNEY.

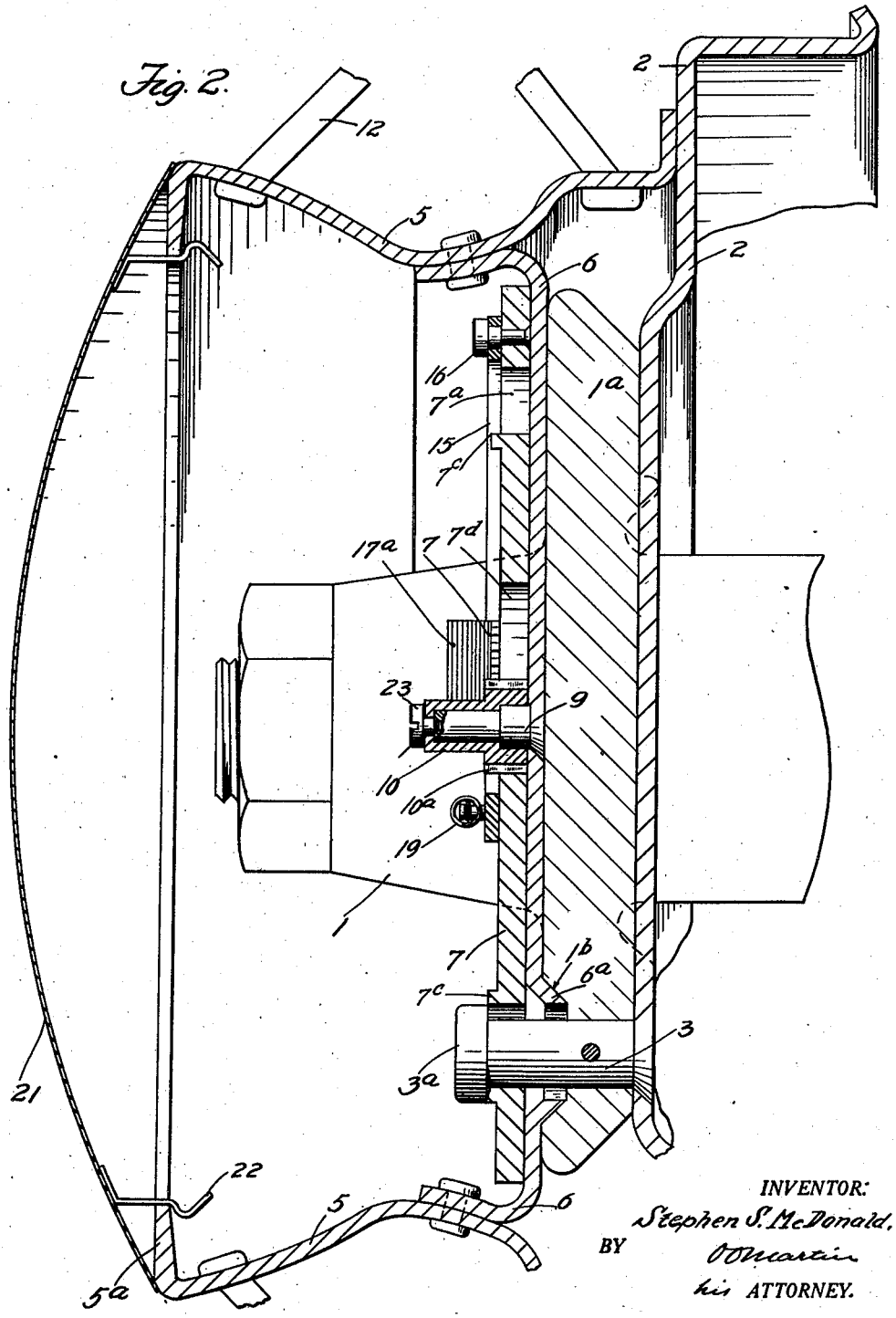

Patented Feb. 16, 1937

2,070,993

UNITED STATES PATENT OFFICE 2,070,993

VEHICLE WHEEL

Stephen S. McDonald, Los Angeles, Calif.

Application July 23, 1935, Serial No. 32,764

8 Claims. (Cl. 301—9)

This invention relates to vehicle wheels and refers particularly to means for dismounting and remounting such wheels.

It is the general object of the present invention to provide simple, positive and reliable means for locking such wheels on the hubs to which such wheels ordinarily are fitted. It is a further object to provide simple and dependable means for operating the wheel locking device.

Figure 1:
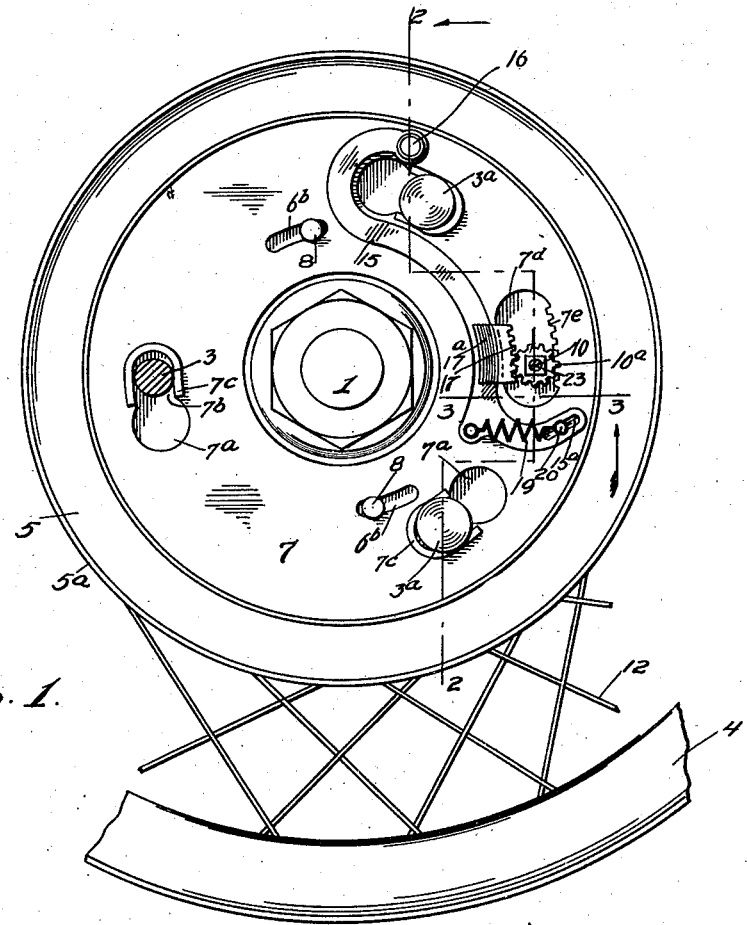
Figures 3, 4:
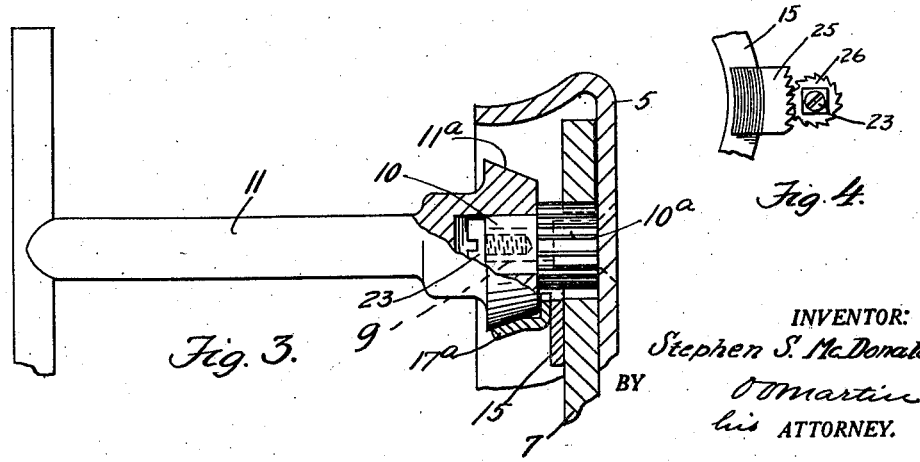

To this end, the invention consists in the combinations hereinafter fully described and illustrated in the appended drawings, of which:

Fig. 1 is a fragmentary side elevation of a vehicle wheel embodying the invention, Fig. 2 is a fragmentary sectional end elevation of the wheel taken substantially on line 2—2 of Fig. 1, in the direction of the arrow, Fig. 3 is a sectional detail view of part of Fig. 1, taken on line 3—3, in direction of the arrow, and with the operating member of the device added, and Fig. 4 is a fragmentary view of a modified detail of construction.

In the form illustrated in the drawings, the wheel comprises an inner hub 1, having a circular flange 1ª, to which a brake drum 2 is secured by means of studs 3. The demountable wheel comprises a rim 4, spokes 12, and an outer hub portion 5. The latter is mounted on a disc 6 having perforations 6ª for seating the disc on the studs 3. The edge of each of these perforations is preferably beveled to fit into sockets 1ᵇ of the flange. An annular locking plate 7 is mountable on the wheel hub 1 and on the aforenamed studs 3, to lock the disc 6 firmly in position on the hub flange, as will now be described in detail.

A series of keyhole shaped perforations is made in the locking plate 7, and as these perforations may be exactly alike, and are shown alike, only one will now be described. The main portion of the perforation, 7ª, is large enough to pass over the head of one of the studs 3, whereupon the plate is given a slight turn to seat the shank of the stud in the smaller portion 7ᵇ. The edge of this portion is shown raised to form a rising cam 7ᶜ, along which the head of the stud is caused to ride when such slight rotation of the locking plate is effected, thereby to draw the plate and the disc 6 tightly together on the hub flange 1ª. While, in the drawings, the stud heads 3ª are shown circular, for convenience, I wish it understood that they may be otherwise shaped for more complete contact with the cams 7ᶜ.

The locking plate is preferably combined with the disc 6, as by means of a series of bolts 8, which ride in slots 6ᵇ of the disc, and these slots are long enough to permit of the relative movement required to seat the stud heads 3ª on the cams 7ᵇ.

A perforation 7ᵈ is made in the locking plate, and this perforation is, along one edge, made with gear teeth 7ᵉ. A stud 9 is rigidly mounted on the disc 6 to ride in this perforation and it is shaped rotatably to support a thimble 10, on which gear teeth 10ª are cut, and these teeth are permanently in mesh with the gear teeth 7ᵉ. The outer end of this thimble is shown squared to receive a socket wrench 11, by means of which the thimble is rotatable in one direction to rotate the locking plate, thereby to engage the stud heads 3ª with the plate cams 7ᵇ, and in the opposite direction again to disengage the plate. Means should be provided for maintaining the thimble 10 axially in position on the stud 9, and such means is here, for the sake of simplicity, shown to consist of a screw 23, but more effective means should be employed in practice.

From this description, it is seen that the wheel normally is tightly clamped on to the hub flange 1ª, and the powerful purchase of the socket wrench makes this clamping so solid that no vibration is possible which might tend to shake the members apart. Also that, as the disc 6 and the locking plate always are held together by the bolts 8, it is a very simple and easy matter quickly to mount and dismount the rim assembly.

In order, however, entirely to eliminate all danger of the clamping members becoming loosened by the vibrations of the wheel incidental to wheel rotations, I have provided means for positively locking the wheel in firmly clamped position on the hub flange.

Such means is, in the drawings, shown to comprise a lever 15, which is mounted to swing on a stud 16 of the locking plate. A toothed member 17 is secured to this lever for engagement with the gear pinion 10ª, which forms part of the thimble element 10. A spring 19, extending from the lever to a stud 20 of the locking plate, maintains these parts yieldingly engaged. The member 17 is made with a beveled portion 17ª, which becomes engaged by a conical shoulder 11ª of the wrench 11, when the latter is applied, to push this lever away far enough to disengage the toothed portion of the member from the gear teeth 10ª and thereby to release the thimble for rotation by the wrench. It should be noted that the smaller the teeth are, the finer the locking adjustment. If preferred, it is also possible to cut off the outer portion of the gear teeth 10ᵃ and to mount an annular ratchet wheel on this reduced portion, substantially as indicated in Fig. 4, where a ratchet wheel 26 is shown mounted for engagement by ratchet teeth of a modified member 25, forming part of the lever 15, if it is found that ordinary gear teeth do not lock the parts together firmly.

Because the lever 15 is rather long and slender, and in order to prevent wheel vibrations from displacing it far enough sidewise to bring the teeth out of engagement, the lever is provided with an extension 15ᵃ, in which an elongated perforation is made, and the stud 20, to which the end of the spring 19 is attached, is seated in this perforation to permit the head of the stud firmly to maintain the lever in close relation to the locking plate.

In present day automobile design, it is becoming common practice to employ a relatively very large hub cap. Such cap is, in Fig. 2, indicated by the numeral 21 and is shown fitted to cover the entire opening of the hub portion 5, thereby completely to enclose all the mechanism of the invention. The particular means for fastening this hub cap is immaterial, several suitable constructions being commercially well known. Such means is here, for this reason, merely indicated by spring fingers 22 engaging the inner flange 5ᵃ.

From the foregoing description, it is seen that my object is to provide simple, inexpensive and positive means for mounting a wheel on its hub and, while one form of structure is shown in the drawings, the full scope of the invention is set forth in the following claims:

I claim:

1. A wheel assembly comprising two members combined for limited relative rotation, one member having an annularly elongated perforation made with teeth along one annular edge, a stud in the other member seated in said perforation, a thimble rotatable on said stud and having gear teeth engaging the teeth of the perforation and made with a squared end whereby to rotate the thimble and thereby to turn one member relative to the other, and means on the perforated member engaging the thimble to lock the thimble in position.

2. A wheel assembly comprising two members combined for limited relative rotation, one member having an annularly elongated perforation made with teeth along one annular edge, a stud on the other member seated in said perforation, a thimble rotatable on said stud and having gear teeth engaging the teeth of the perforation and made with a squared end whereby to rotate the thimble and thereby to turn one member relative to the other, a lever on the perforated member having teeth, and a spring urging the teeth of said lever into engagement with teeth on the thimble to lock the thimble against rotation.

3. A wheel assembly comprising two members combined for limited relative movement, one member having an annularly elongated perforation made with teeth along one annular edge, a stud on the other member seated in said perforation, a thimble rotatable on said stud and having gear teeth engaging the teeth of the perforation and made with a squared end whereby to rotate the thimble and thereby to turn one member relative to the other, a lever on the perforated member having teeth, a spring urging the teeth of said lever into engagement with teeth on the thimble to lock the thimble against rotation, and means maintaining said lever in position against the perforated member.

4. The combination with two coaxial relatively rotatable members, one member having gear teeth, of a toothed thimble on the other member engaging the teeth of the first member, a lever on the first member having teeth engaging the teeth of said thimble to prevent rotation of the latter and made with a cam surface adjacent said teeth, the beveled member on the lever and the squared shank on the pinion being adapted for engagement by a socket wrench to withdraw the teeth of the lever from the teeth of the pinion and to rotate the pinion.

5. The combination with two coaxial relatively rotatable members, one member having gear teeth, of a toothed thimble on the other member engaging the teeth of the first member, a lever on the first member having teeth engaging the thimble teeth to prevent rotation of the thimble and made with a cam surface adjacent said teeth, means yieldingly maintaining the lever teeth in mesh with the thimble teeth, the beveled member on the lever and the squared shank on the pinion being adapted for engagement by a socket wrench to withdraw the teeth of the lever from the teeth of the pinion and to rotate the pinion.

6. In combination with a pinion having a squared shank, a lever, and a beveled member on said lever provided with teeth engaging teeth of said pinion to lock the pinion against rotation, said squared shank and beveled member being engageable by a socket wrench thereby to withdraw the teeth of said member from the pinion teeth.

7. In combination, a pinion having a shank engageable by a wrench to rotate the pinion, a lever having teeth engaging the pinion teeth to lock the pinion against rotation and provided with a beveled portion adjacent said teeth for engagement by a beveled shoulder of said wrench thereby to withdraw the lever teeth from the pinion.

8. In combination, a pinion having a shank for engagement by a wrench to rotate the pinion, a lever, a member on said lever having teeth engaging the pinion teeth to lock the pinion against rotation and provided with a beveled portion adjacent said teeth for engagement by said wrench, means yieldingly maintaining the teeth of said member in engagement with the pinion teeth, the engagement of the wrench with said beveled portion causing a withdrawal of the member from the pinion against the tension of said yielding means.

STEPHEN S. McDONALD.